(12) United States Patent
Kurose et al.

(10) Patent No.: US 11,039,389 B2
(45) Date of Patent: Jun. 15, 2021

(54) INFORMATION PROCESSING APPARATUS, CONTROL METHOD, INFORMATION PROCESSING SYSTEM, AND NON-TRANSITORY COMPUTER-READABLE STORAGE MEDIUM WITH EXECUTABLE CONTROL PROGRAM STORED THEREON

(71) Applicant: NINTENDO CO., LTD., Kyoto (JP)

(72) Inventors: Sho Kurose, Kyoto (JP); Masahiro Shoji, Kyoto (JP); Takayuki Shibata, Kyoto (JP); Weiwei Yan, Kyoto (JP); Hiroyuki Takeuchi, Kyoto (JP); Yoshihisa Kondo, Kyoto (JP); Masayoshi Matsuoka, Kyoto (JP); Yoshitaka Imura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 15 days.

(21) Appl. No.: 16/366,056

(22) Filed: Mar. 27, 2019

(65) Prior Publication Data
US 2019/0313330 A1    Oct. 10, 2019

(30) Foreign Application Priority Data

Apr. 4, 2018   (JP) .............................. JP2018-072322

(51) Int. Cl.
*G08C 17/00* (2006.01)
*H04W 52/02* (2009.01)
(Continued)

(52) U.S. Cl.
CPC ....... *H04W 52/0209* (2013.01); *H04W 28/06* (2013.01); *H04W 40/04* (2013.01);
(Continued)

(58) Field of Classification Search
None
See application file for complete search history.

(56) References Cited

U.S. PATENT DOCUMENTS 7,295,526 B2 * 11/2007 Guanter ............ H04W 52/0258
                                                            370/310
8,583,190 B1 * 11/2013 Kopikare .............. H04W 52/52
                                                              455/574

(Continued)

FOREIGN PATENT DOCUMENTS

JP        2013-135303        7/2013

*Primary Examiner* — Gerald A Smarth
(74) *Attorney, Agent, or Firm* — Nixon & Vanderhye PC

(57) ABSTRACT

An information processing apparatus includes a receiver, a memory, an information processing unit which performs information processing and makes mode transition at least between a first mode and a second mode lower, a mode management module which has the information processing unit make mode transition from the second mode to the first mode when at least any one of the number of packets stored in the memory, a data amount of a packet stored in the memory, and a content of a packet stored in the memory satisfies a first condition, and a reading module which reads the packet stored in the memory when the information processing unit makes mode transition from the second mode to the first mode. The information processing unit makes mode transition from the first mode to the second mode when it has performed processing including reading of the packet by the reading module.

20 Claims, 11 Drawing Sheets

(51) Int. Cl.
*H04W 28/06* (2009.01)
*H04W 40/04* (2009.01)

(52) U.S. Cl.
CPC ..... *H04W 52/028* (2013.01); *H04W 52/0229* (2013.01); *H04W 52/0235* (2013.01)

(56) References Cited

U.S. PATENT DOCUMENTS

| | | |
|---|---|---|
| 9,640,138 B2 | 5/2017 | Yasuda et al. |
| 9,681,381 B2* | 6/2017 | Kang ............... H04W 4/80 |
| 10,045,297 B1* | 8/2018 | Shmidt ............ H04W 52/0229 |
| 10,708,842 B2* | 7/2020 | Shah ................ H04W 52/0216 |
| 2007/0230393 A1* | 10/2007 | Sinha .............. H04W 76/38 |
| | | 370/328 |
| 2009/0247241 A1* | 10/2009 | Gollnick ........... H01Q 21/24 |
| | | 455/574 |
| 2009/0319810 A1 | 12/2009 | Aoyama |
| 2011/0213992 A1* | 9/2011 | Satsangi ........... G06F 1/3209 |
| | | 713/300 |
| 2013/0166679 A1 | 6/2013 | Kuwahara |
| 2013/0201889 A1* | 8/2013 | Hong ............... H04W 52/0209 |
| | | 370/311 |
| 2014/0071866 A1* | 3/2014 | Maciocco ......... H04W 52/0229 |
| | | 370/311 |
| 2014/0157009 A1* | 6/2014 | Kherani ............ G06F 1/3278 |
| | | 713/300 |
| 2015/0082433 A1* | 3/2015 | Harlacher ......... H04L 63/1458 |
| | | 726/23 |
| 2015/0282086 A1* | 10/2015 | Gupta .............. H04W 52/0229 |
| | | 455/574 |

* cited by examiner

INFORMATION PROCESSING APPARATUS, CONTROL METHOD, INFORMATION PROCESSING SYSTEM, AND NON-TRANSITORY COMPUTER-READABLE STORAGE MEDIUM WITH EXECUTABLE CONTROL PROGRAM STORED THEREON

This nonprovisional application is based on Japanese Patent Application No. 2018-072322 filed with the Japan Patent Office on Apr. 4, 2018, the entire contents of which are hereby incorporated by reference.

FIELD

The present technology relates to an information processing apparatus capable of receiving a packet from another apparatus through radio communication, a control method performed in the information processing apparatus, an information processing system including the information processing apparatus, and a non-transitory computer-readable storage medium with an executable control program stored thereon, the control program being executed by the information processing apparatus.

BACKGROUND AND SUMMARY

A technology of exchanging data through radio communication between information processing apparatuses has been known. For example, a communication terminal including transmission and reception means for transmitting and receiving data between the terminal and another communication terminal within a prescribed positional range has been known.

When timing of exchange of data is not shared between apparatuses, data is transmitted at unexpected timing. Therefore, an information processing apparatus is continuously or periodically in a data reception awaiting state.

On the other hand, there is a need for reduction in power consumption. In particular, low power consumption is required in a portable information processing apparatus.

The present technology provides an approach for reducing power consumption in a configuration in which a packet is repeatedly received from another apparatus through radio communication.

An exemplary embodiment provides an information processing apparatus according to one embodiment, the information processing apparatus including a receiver configured to repeatedly receive a packet from another apparatus through radio communication, a memory configured to store the packet received by the receiver, an information processing unit configured to perform information processing and to make mode transition at least between a first mode and a second mode lower in power consumption than the first mode, a mode management module configured to have the information processing unit make mode transition from the second mode to the first mode when at least any one of the number of packets stored in the memory, a data amount of a packet stored in the memory, and a content of a packet stored in the memory satisfies a first condition, and a reading module configured to read the packet stored in the memory when the information processing unit makes mode transition from the second mode to the first mode. The information processing unit makes mode transition from the first mode to the second mode when the information processing unit has performed processing including reading of the packet by the reading module.

According to the embodiment, even when the information processing unit is in the second mode lower in power consumption, the receiver is able to receive a packet. When a data amount of the packet received by the receiver and stored in the memory satisfies the first condition, the information processing unit makes mode transition from the second mode to the first mode and performs necessary processing, and again makes mode transition to the second mode. By making use of such mode transition of the information processing unit, power consumption in the information processing apparatus can be reduced.

The first condition may include a condition that the number of received packets exceeds a prescribed number. By adopting such a configuration, mode transition between the first mode and the second mode can be made in accordance with the number of received packets.

The first condition may include a condition that a data amount of the received packet exceeds a prescribed data amount. By adopting such a configuration, mode transition between the first mode and the second mode can be made in accordance with the data amount of the received packet.

The first condition may include a condition that the received packet includes prescribed data. By adopting such a configuration, mode transition between the first mode and the second mode can be made in accordance with a content of the received packet.

The memory may store a packet which satisfies a second condition among packets received by the receiver. By adopting such a configuration, more types of packets can be stored while a storage area in the memory is efficiently used.

The second condition may include a condition that the packet received by the receiver conforms to a prescribed format. By adopting such a configuration, only a necessary packet can be selected by more simplified processing from among a variety of packets received by the receiver.

The second condition may at least partly be determined based on identification information of a packet received in advance by the receiver. By adopting such a configuration, even when identical packets are received in a redundant manner, redundant storage of such identical packets in the memory can be prevented.

The identification information may be at least one of a value representing data constituting the packet received by the receiver and at least a part of data constituting the packet received by the receiver. By adopting such a configuration, a packet identical to the packet received by the receiver can reliably be specified.

The value representing the data constituting the packet received by the receiver may be a hash value calculated from the data constituting the packet. By adopting such a configuration, processing for determining whether or not packets are identical to each other can be simplified.

The hash value may be added by a sender of a packet of interest. By adopting such a configuration, a reception side can perform processing in connection with identity of packets faster and can also check authenticity of the received packet itself.

The second condition may at least partly be determined based on a packet which is stored in the memory but has not yet been read into the information processing unit. By adopting such a configuration, redundant storage of identical packets received at temporally proximate timing can be prevented.

The second condition may at least partly be determined by the information processing unit. By adopting such a configuration, a packet to be stored can be determined with a result of information processing performed by the information processing unit being reflected.

In the second mode, reception by the receiver and storage in the memory may repeatedly be performed. By adopting such a configuration, packets can successively be received.

The reading module may erase, after the reading module reads the packet stored in the memory, that packet from the memory. By adopting such a configuration, packets can successively be received with a storage capacity being limited.

The receiver may receive the packet without establishing connection to another apparatus. By adopting such a configuration, processing involved with data transmission can be simplified, and consequently a time period required for transmission and reception of a packet can be shortened.

Handshaking with another apparatus does not have to be performed. By adopting such a configuration, a time period required for transmission and reception of a packet can further be shortened.

The receiver may provide time information to the received packet. By adopting such a configuration, even though the information processing unit processes a received packet at a later time, timing of actual reception of each packet to be processed can be known and information processing requiring reception timing can also be performed.

The packet may include data on a game application. By adopting such a configuration, the information processing apparatus according to the present embodiment can also be applied to a game application.

A radio processing unit which includes at least the receiver and is separated from the information processing unit may be arranged in the information processing apparatus, and the information processing unit may be higher in power consumption than the radio processing unit. By adopting such a configuration, such a form of use that a radio processing unit relatively lower in power consumption is responsible for reception of a packet and an information processing unit relatively higher in power consumption collectively processes received packets only for a required period is allowed.

The information processing unit may be configured to sense a signal from the radio processing unit indicating mode transition also in the second mode. By adopting such a configuration, the information processing unit can make mode transition from the second mode to the first mode at any timing when a signal indicating mode transition is given from the radio processing unit.

The information processing apparatus may further include a transmitter configured to transmit a packet to another apparatus. As the transmitter of the information processing apparatus transmits a packet to another apparatus, data can bidirectionally be exchanged between information processing apparatuses.

The mode management module may have the information processing unit make mode transition from the second mode to the first mode without depending on a data amount of the packet stored in the memory, in response to the packet received by the receiver including instructions to make mode transition to the second mode. By adopting such a configuration, a request for having the information processing unit perform some kind of processing at any timing can be met.

According to another embodiment, a control method in an information processing apparatus is provided, the information processing apparatus including a receiver configured to repeatedly receive a packet from another apparatus through radio communication, a memory configured to store the packet received by the receiver, and an information processing unit configured to perform information processing and to make mode transition at least between a first mode and a second mode lower in power consumption than the first mode. The control method includes having the information processing unit make mode transition from the second mode to the first mode when at least any one of the number of packets stored in the memory, a data amount of a packet stored in the memory, and a content of a packet stored in the memory satisfies a first condition, performing processing including reading of the packet stored in the memory when transition from the second mode to the first mode is made, and the information processing unit making mode transition from the first mode to the second mode after the information processing unit has performed the processing.

According to yet another embodiment, an information processing system including a first information processing apparatus and a second information processing apparatus is provided. The first information processing apparatus includes a receiver configured to repeatedly receive a packet from the second information processing apparatus through radio communication, a memory configured to store the packet received by the receiver, an information processing unit configured to perform information processing and to make mode transition at least between a first mode and a second mode lower in power consumption than the first mode, a mode management module configured to have the information processing unit make mode transition from the second mode to the first mode when at least any one of the number of packets stored in the memory, a data amount of a packet stored in the memory, and a content of a packet stored in the memory satisfies a first condition, and a reading module configured to read the packet stored in the memory when the information processing unit makes mode transition from the second mode to the first mode. The information processing unit makes mode transition from the first mode to the second mode when the information processing unit has performed processing including reading of the packet by the reading module.

According to still another embodiment, a non-transitory computer-readable storage medium with an executable control program stored thereon is provided, the control program being executed by an information processing apparatus. The information processing apparatus includes a radio communication unit including a receiver configured to repeatedly receive a packet from another apparatus through radio communication, a memory configured to store the packet received by the receiver, and an information processing unit configured to perform information processing and to make mode transition at least between a first mode and a second mode lower in power consumption than the first mode. The control program, when executed by the information processing apparatus, causes the radio communication unit to perform having the information processing unit make mode transition from the second mode to the first mode when at least any one of the number of packets stored in the memory, a data amount of a packet stored in the memory, and a content of a packet stored in the memory satisfies a first condition. The information processing unit performs processing including reading of the packet stored in the memory when the information processing unit makes transition from the second mode to the first mode, and makes mode transition from the first mode to the second mode after the information processing unit has performed the processing.

The foregoing and other objects, features, aspects and advantages of the exemplary embodiments will become

DETAILED DESCRIPTION OF NON-LIMITING EXAMPLE EMBODIMENTS

Figure 1:
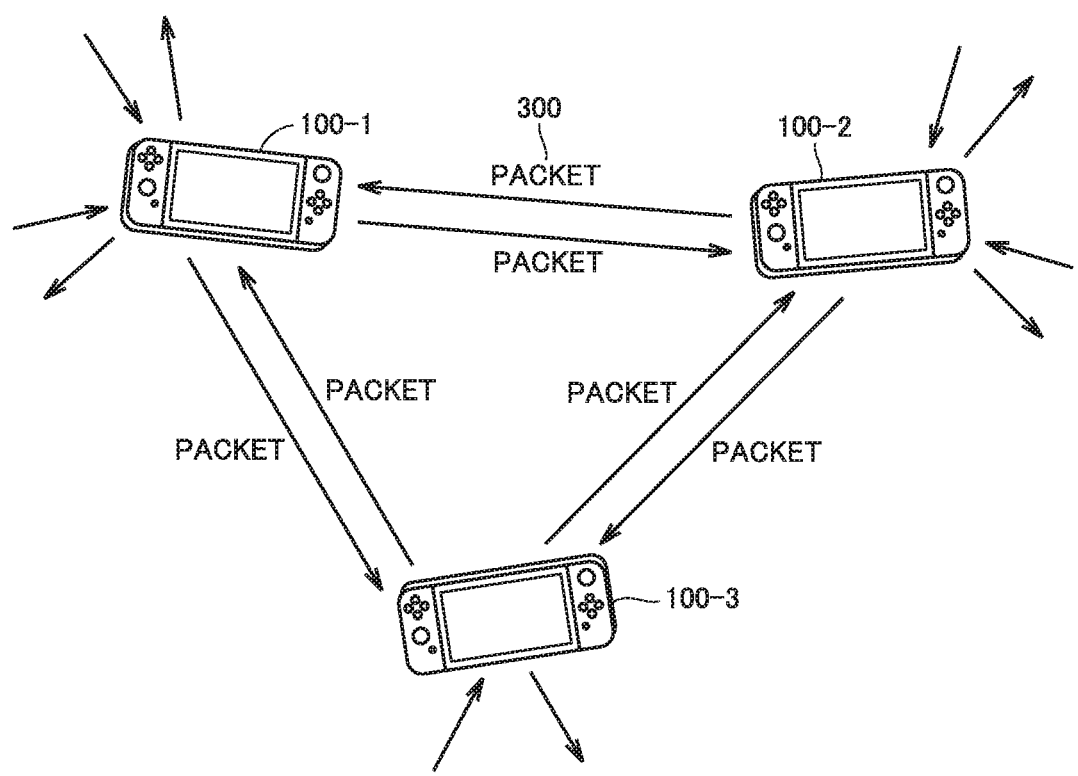
FIG. 1 shows an exemplary illustrative non-limiting drawing illustrating an information processing system according to the present embodiment.

The present embodiment will be described in detail with reference to the drawings. The same or corresponding elements in the drawings have the same reference characters allotted and description thereof will not be repeated.

[A. Information Processing System]

Overview of an information processing system 1 according to the present embodiment will initially be described with reference to FIG. 1.

Information processing system 1 includes a plurality of information processing apparatuses 100-1, 100-2, 100-3, . . . (which are also collectively referred to as an "information processing apparatus 100" below) capable of exchanging data through radio communication.

Each of information processing apparatuses 100-1, 100-2, 100-3, . . . transmits a packet 300 containing information held by each apparatus periodically or for each arbitrary event. Each information processing apparatus 100 receives one packet 300 or a plurality of packets 300.

Packet 300 is typically transmitted as being broadcast. A scheme of transmission of packet 300 is not limited to broadcasting, but may be multicasting, or unicasting when destination information processing apparatus 100 can be specified by any method.

Each of information processing apparatuses 100-1, 100-2, 100-3, . . . also enters a reception awaiting state for receiving packet 300. When packet 300 from any information processing apparatus 100 arrives during a period of this reception awaiting state (which is also referred to as a "reception awaiting period" below), packet 300 is received.

Information processing system 1 as shown in FIG. 1 is applicable to such an application as allowing exchange of any information among an unspecified number of users. A game application is assumed as one example of such an application. In this case, a packet transmitted or received by each information processing apparatus 100 includes data on a game application.

In another example, for example, the information processing system can be applied also to such an application as allowing distribution of any coupon. In this case, a packet transmitted and received by each information processing apparatus 100 contains data on a coupon.

The term "packet" herein encompasses any packet transmitted by each information processing apparatus 100 and may encompass packets in other data formats in addition to a packet in a data format as will be described later.

Examples of radio communication employed by information processing apparatus 100 include wireless local area network (LAN) in conformity with IEEE802.11 standards and Bluetooth®. As will be described later, in information processing system 1 according to the present embodiment, no such procedure as handshaking is not performed in exchange of packet 300 among information processing apparatuses 100.

Though information processing system 1 according to the present embodiment is applicable to any application, it can be implemented as a game system by way of typical example. In such an implementation, information processing apparatus 100 can also be called a game apparatus. Information processing apparatus 100 can be implemented by a portable device such as a smartphone or a tablet without being limited to the game apparatus.

Not only information processing apparatus 100 implementing information processing system 1 shown in FIG. 1 may be determined in advance but also the information processing system may autonomously be implemented by presence of information processing apparatuses 100 with a function to transmit and receive a packet within an area where they can communicate with one another. The technical scope of the present disclosure may encompass also information processing system 1 autonomously implemented by any information processing apparatuses 100.

[B. Information Processing Apparatus]

Overview of information processing apparatus 100 implementing information processing system 1 according to the present embodiment will now be described with reference to FIG. 2.

Information processing apparatus 100 includes a main control unit 110, a radio communication unit 120, an operation unit 102, an indicator 104, a display 106, a speaker 108, and a battery 140.

Main control unit 110 is an entity which controls overall processing in information processing apparatus 100 and also referred to as an application processor. Main control unit 110 includes a processor 112, a main memory 114, and a non-volatile memory 116 as main components.

Processor 112 is implemented by a central processing unit (CPU) or a graphical processing unit (GPU) and executes a program stored in non-volatile memory 116 by developing the program on main memory 114. Main memory 114 is implemented by a dynamic random access memory (DRAM) or a static random access memory (SRAM) and holds data in a volatile manner. Non-volatile memory 116 is implemented by a flash memory or an electrically erasable programmable read-only memory (EEPROM) and holds data in a non-volatile manner. Non-volatile memory 116 typically stores a control program 130 which provides a basic function of information processing apparatus 100, an application program 132 for performing any game or information processing, and reception data 134 including a packet received by radio communication unit 120 (which is also referred to as a "reception packet" below). Reception data 134 includes a content in one reception packet or a plurality of reception packets and is referred to as appropriate by application program 132.

Main control unit 110 may be mounted as a system large scale integration (LSI) including components described above. In this case, the main control unit may be mounted in a form of a system-on-a-chip (SoC) in which the components are integrated.

Radio communication unit 120 corresponding to a radio processing unit has a function to repeatedly receive a packet 300 from another apparatus through radio communication and transmit packet 300 to another apparatus. Radio communication unit 120 can take, as typical operation states, (1) a transmission state in which data is transmitted, (2) a reception state in which data is received, (3) a transmission and reception state in which data is transmitted and received, and (4) a power saving state in which neither of transmission and reception is performed. Radio communication unit 120 includes a radio module 122, a radio controller 124, and a buffer memory 128 as main components.

Radio module 122 is a circuit which transmits and receives a radio signal to and from another information processing apparatus 100 through an electrically connected antenna 123, and includes a reception circuit 122RX and a transmission circuit 122TX. Reception circuit 122RX corresponds to the receiver which repeatedly receives a packet from another apparatus through radio communication and transmission circuit 122TX corresponds to a transmitter which transmits a packet to another apparatus. The receiver can include not only radio module 122 but also antenna 123.

Radio module 122 basically transmits and receives a packet through any one channel among a plurality of channels prepared in advance. A channel used for transmission of a packet may be the same as or different from a channel used for reception of a packet. A plurality of channels may simultaneously be used as necessary.

More specifically, radio module 122 includes a high-frequency generation circuit, a modulation circuit, a demodulation circuit, an encoding circuit, and the like. A configuration for setting an appropriate frequency or an appropriate modulation scheme is adopted for radio module 122 in accordance with an implemented communication scheme.

Radio controller 124 controls transmission and reception of a radio signal by radio module 122 by execution by processor 126 of firmware 127 representing a control program. A circuit such as an application specific integrated circuit (ASIC) or a field-programmable gate array (FPGA) instead of processor 126 may perform the entire or partial processing performed by radio controller 124.

Buffer memory 128 temporarily stores data (packet 300) to be sent from radio module 122 and data received by radio module 122 (reception packet). Buffer memory 128 is typically implemented by a first-in first-out (FIFO) memory and writing and reading of data into and from buffer memory 128 are controlled by radio controller 124 and main control unit 110.

Figure 2:
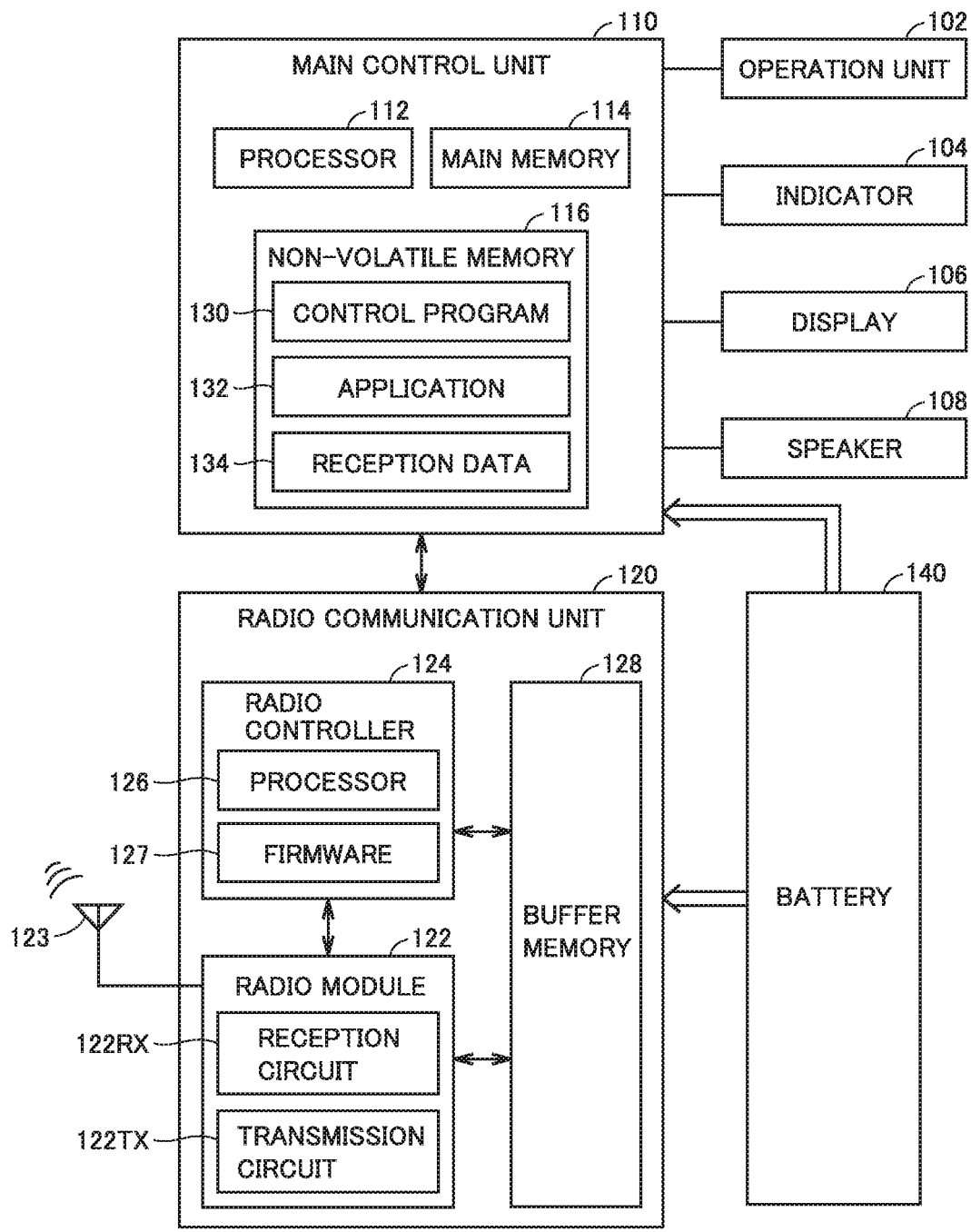
FIG. 2 shows an exemplary illustrative non-limiting drawing illustrating a hardware configuration of an information processing apparatus according to the present embodiment.

An example in which buffer memory 128 is mounted as a part of radio communication unit 120 is shown in the configuration shown in FIG. 2. Without being limited as such, a function corresponding to buffer memory 128 may be arranged in main control unit 110 or in a portion other than main control unit 110 and radio communication unit 120. When a function corresponding to buffer memory 128 is mounted on main control unit 110, a partial area in main memory 114 or non-volatile memory 116 may be used as a buffer memory.

Radio communication unit 120 as the radio processing unit thus includes radio module 122 corresponding to the receiver. Basically, main control unit 110 corresponding to the information processing unit is higher in power consumption (an amount of electric power (W) consumed per unit time) than radio communication unit 120.

Operation unit 102 accepts an operation by a user and outputs information representing a content of the operation by the user to main control unit 110. Typically, operation unit 102 includes a push button, a control lever, a touch panel, or a mouse. Alternatively, a controller which is separate from information processing apparatus 100 and connected through a wire or wirelessly may be included as operation unit 102.

Indicator 104 is arranged as being exposed at a surface of information processing apparatus 100 and gives a visual notification to a user in response to a command from main control unit 110. Typically, indicator 104 includes a light emitting diode (LED).

Display 106 is arranged on a main surface of information processing apparatus 100 and shows any image in response to a command from main control unit 110. Display 106 is typically implemented by a liquid crystal display (LCD).

Speaker 108 is arranged as being partially exposed at the surface of information processing apparatus 100 and gives an audio notification to a user in response to a command from main control unit 110.

Battery 140 supplies electric power to main control unit 110 and radio communication unit 120. As will be described later, main control unit 110 can switch between an operation mode in which normal processing can be performed (which is also referred to as a "normal mode" below) and an operation mode lower in power consumption than the normal mode (which is also referred to as a "power saving mode" below). When main control unit 110 is set to the power saving mode, electric power lower than electric power supplied to main control unit 110 in the normal mode is supplied to main control unit 110.

The "power saving mode" can be called, for example, a stand-by mode or a sleep mode. The present disclosure can be applied to any apparatus or any system including two operation modes different in power consumption from each other.

An example in which main control unit 110 as a whole makes mode transition to the power saving mode will be shown in the description below as a typical example. An example in which only a part of main control unit 110 (typically processor 112) makes transition to the operation mode lower in power consumption than the normal mode, however, can also be encompassed in the concept of the "power saving mode" in the present disclosure.

By receiving electric power from battery 140, radio communication unit 120 maintains a state that it is able to transmit and receive a radio signal. Since switching between a transmission period and a reception period (or a reception awaiting period) is periodically made, a state that transmission or reception is enabled does not always continue.

[C. Procedure for Transmission and Reception of Packet]

In information processing system 1 according to the present embodiment, each information processing apparatus 100 periodically transmits (broadcasts) packet 300. As another information processing apparatus 100 located proximate to information processing apparatus 100 which has transmitted packet 300 receives that transmitted packet 300, transmission of packet 300 is successful.

Figure 3:
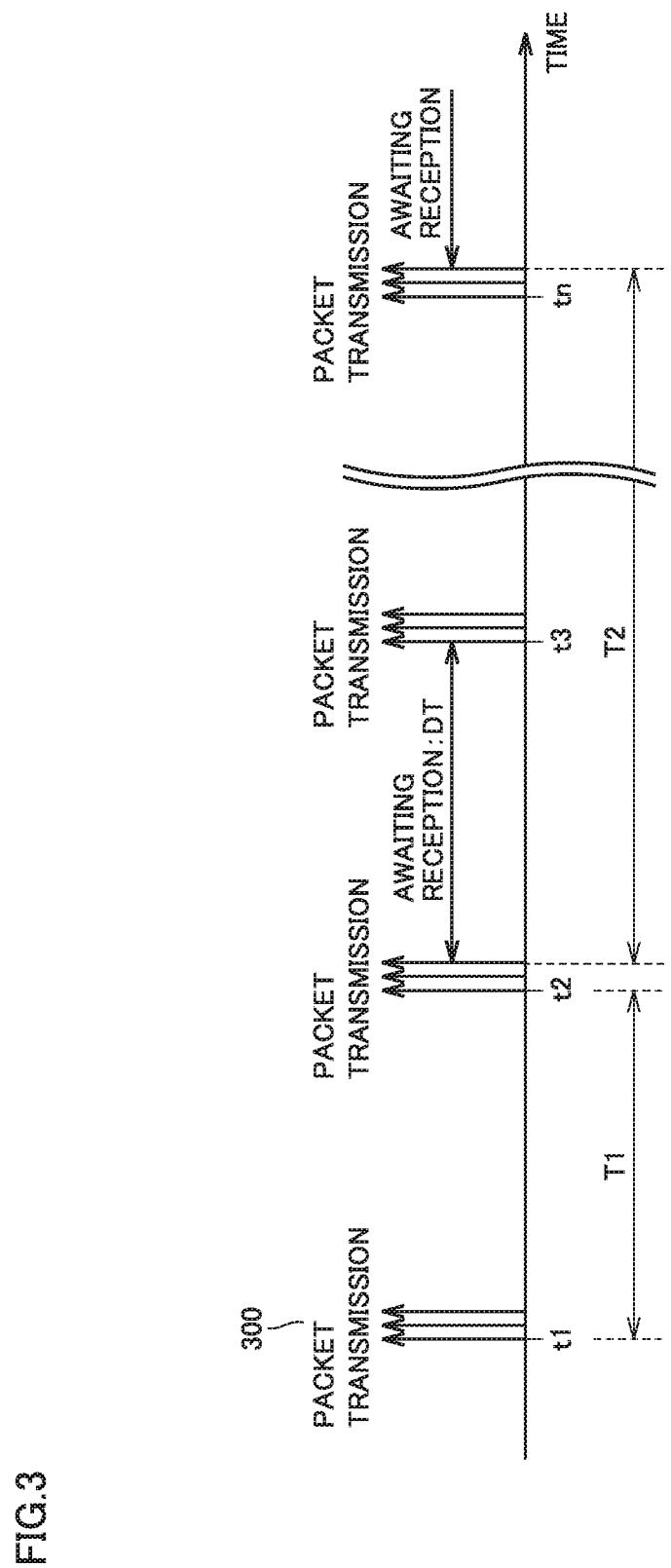
FIG. 3 shows an exemplary illustrative non-limiting drawing illustrating a procedure for transmitting and receiving a packet in the information processing apparatus according to the embodiment.

Referring to FIG. 3, each information processing apparatus 100 transmits (broadcasts) packet 300 every predetermined transmission cycle T1. Packet 300 in each transmission cycle may be transmitted a plurality of times. Namely, identical packets 300 may be transmitted a plurality of times like a burst.

Each information processing apparatus 100 is in a standby (reception awaiting) state of awaiting packet 300 from another information processing apparatus 100 while it is not transmitting packet 300 (a reception awaiting period DT). Reception awaiting period DT may be provided for each reception cycle T2.

For example, transmission cycle T1 may be set to 100 [msec.] and reception cycle T2 may be set to several ten times as long as transmission cycle T1 (for example, 3 [sec.]).

Intermittent transmission of packet 300 and wait for packet 300 can achieve reduction in power consumption in radio communication unit 120 of information processing apparatus 100.

Figure 4:
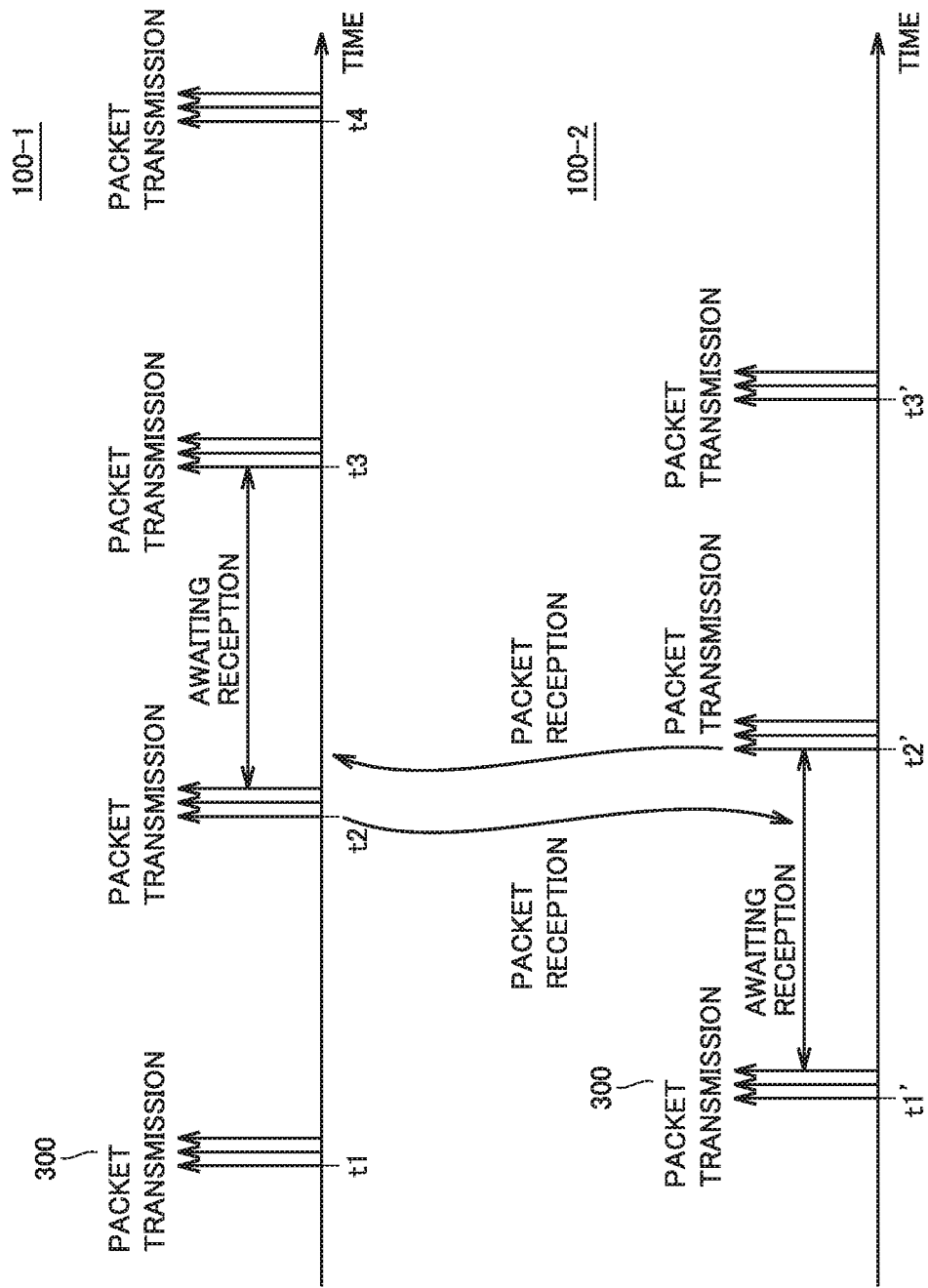
FIG. 4 shows an exemplary illustrative non-limiting drawing illustrating a procedure for exchanging data in the information processing system according to the present embodiment.

One example of a data exchange procedure in information processing system 1 according to the present embodiment will be described with reference to FIG. 4. FIG. 4 shows an example in which information processing apparatus 100-1 and information processing apparatus 100-2 are located within an area where they can communicate with each other.

Information processing apparatus 100-1 transmits packet 300 at times t1, t2, t3, t4, . . . and receives packet 300 during a period until time t3 after transmission of packet 300 at time t2.

Information processing apparatus 100-2 transmits packet 300 at times t1', t2', t3', . . . and receives packet 300 from another information processing apparatus 100 during a period until time t2' after transmission of packet 300 at time t1'.

In the example shown in FIG. 4, information processing apparatus 100-2 is in a state of awaiting reception of packet 300 at time t2 when information processing apparatus 100-1 transmits packet 300. Therefore, information processing apparatus 100-2 receives packet 300 transmitted from information processing apparatus 100-1.

Alternatively, information processing apparatus 100-1 is in a state of awaiting reception of packet 300 at time t2' when information processing apparatus 100-2 transmits packet 300. Therefore, information processing apparatus 100-1 receives packet 300 transmitted from information processing apparatus 100-2.

As shown in FIG. 4, each information processing apparatus 100 transmits and receives packet 300 at timing unique to each apparatus. Information processing apparatuses 100 are not exactly identical in transmission cycle and reception cycle. Therefore, when one information processing apparatus 100 is in the reception awaiting state at timing of transmission of packet 300 by another information processing apparatus 100, transmission of packet 300 is successful.

As shown in FIG. 4, when each information processing apparatus 100 transmits a packet and any information processing apparatus 100 in the reception awaiting state receives that packet in information processing system 1, the packet can successfully be transmitted. A receiver 1202 (radio module 122) of radio communication unit 120 which implements information processing apparatus 100 can thus receive a packet without establishing connection to another information processing apparatus 100. By adopting such a protocol obviating the need for connection between information processing apparatuses 100, simple and fast data exchange can be realized. Since timing of a next communication event does not have to be adjusted (when next communication will come from a destination is still unknown), a connection procedure can be simplified.

Under the protocol adopted in the present embodiment, receiver 1202 (radio module 122) of radio communication unit 120 implementing information processing apparatus 100 is configured not to transmit a response even though it receives a packet.

In information processing system 1 according to the present embodiment, handshaking between information processing apparatuses 100 is not required. Therefore, if only transmission and reception of packet 300 are well timed between information processing apparatuses 100, packet 300 can immediately be transmitted.

[D. Management of Operation Mode]

Management of an operation mode in information processing apparatus 100 implementing information processing system 1 according to the present embodiment will now be described.

Information processing apparatus 100 according to the present embodiment includes main control unit 110 and radio communication unit 120 (see FIG. 2). Main control unit 110 is higher in power consumption than radio communication unit 120. Therefore, radio communication unit 120 is mainly responsible for processing for transmitting and receiving (waiting for reception of) packet 300 involved with data exchange. Though main control unit 110 performs information processing as necessary, it maintains the power saving mode while it does not have to perform information processing. By thus appropriately managing the operation mode of main control unit 110, power consumption in information processing apparatus 100 as a whole can be reduced.

Figure 5:
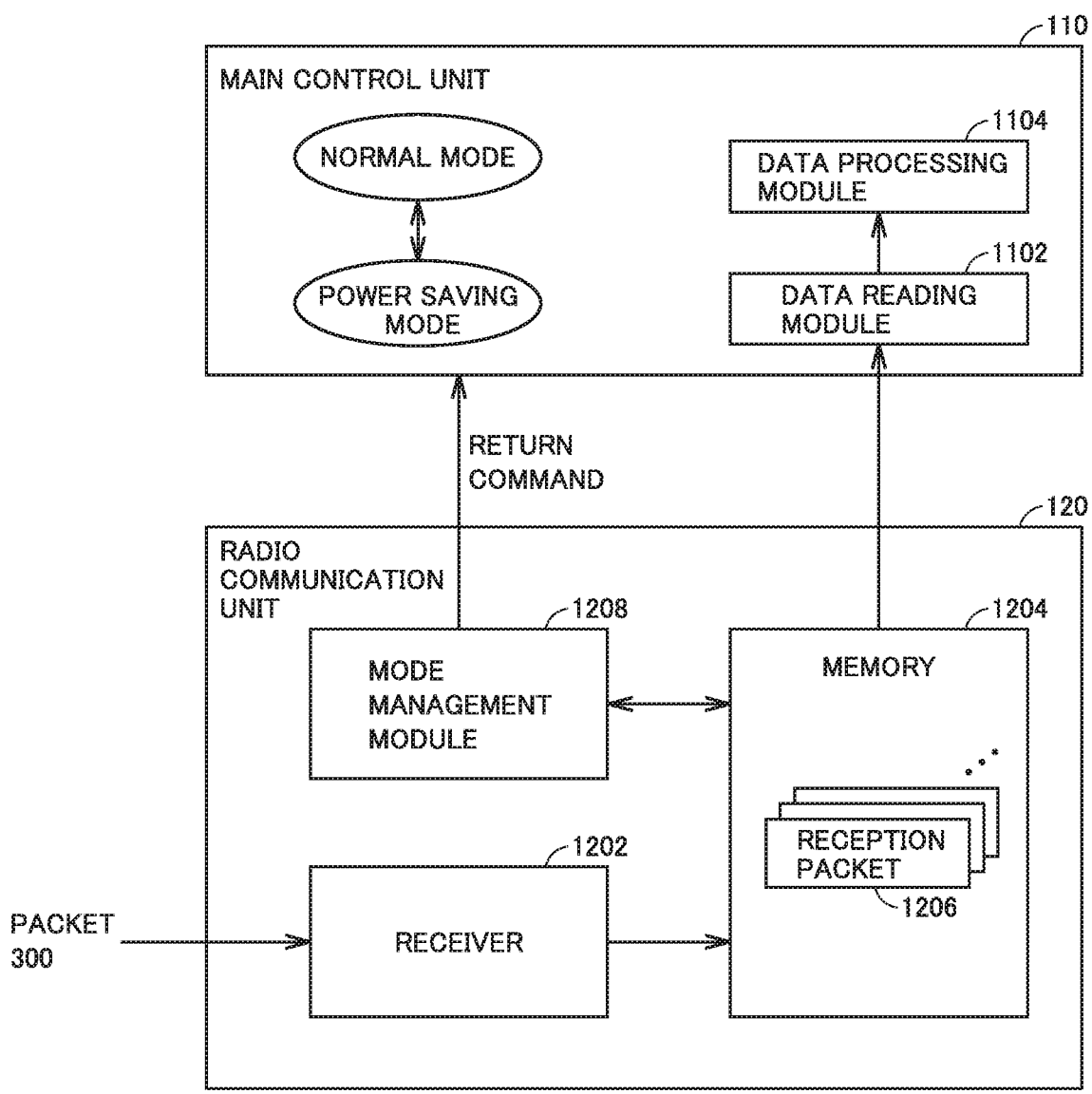
FIG. 5 shows an exemplary illustrative non-limiting drawing illustrating a functional configuration for managing an operation mode in the information processing apparatus according to the present embodiment.

Referring to FIG. 5, main control unit 110 corresponds to the information processing unit, and it can perform information processing and can make mode transition at least between the normal mode (a first mode) and the power saving mode (a second mode) lower in power consumption than the normal mode.

Main control unit 110 includes a data reading module 1102 and a data processing module 1104 as its functional configuration. Data reading module 1102 and data processing module 1104 are typically implemented by execution by processor 112 of control program 130 and/or application program 132 (see FIG. 2).

Radio communication unit 120 includes receiver 1202, a memory 1204, and a mode management module 1208 as its functional configuration. Typically, receiver 1202 is implemented by radio module 122, memory 1204 is implemented by buffer memory 128, and mode management module 1208 is implemented by execution of firmware 127 by radio controller 124.

Receiver 1202 repeatedly receives packet 300 from another information processing apparatus 100 through radio communication. Memory 1204 cumulatively stores reception packet 1206 received by receiver 1202. Memory 1204 accumulates reception packet 1206 up to a predetermined upper limit number of packets. When the number of reception packets 1206 accumulated in memory 1204 reaches the upper limit, some or all of reception packets 1206 may be erased.

In particular, in the power saving mode, main control unit 110 is unable to immediately process a received packet. Therefore, the received packet is accumulated in memory 1204 as reception packet 1206. Thus, reception by receiver 1202 and storage in memory 1204 are repeatedly performed in the power saving mode.

Mode management module 1208 has main control unit 110 make mode transition from the power saving mode to the normal mode when at least any one of the number of reception packets 1206 stored in memory 1204, a data amount of reception packet 1206 stored in memory 1204, and a content of reception packet 1206 stored in memory 1204 satisfies a first condition.

Typically, the first condition includes a condition that the number of reception packets 1206 exceeds a prescribed number. Mode management module 1208 has main control unit 110 make mode transition from the power saving mode to the normal mode when the number of reception packets 1206 exceeds a prescribed number. The number of reception packets 1206 corresponds to the number of stored reception packets 1206.

In another typical example, the first condition includes a condition that a data amount of reception packet 1206 exceeds a prescribed data amount. Mode management module 1208 has main control unit 110 make mode transition from the power saving mode to the normal mode when the data amount of reception packet 1206 exceeds a prescribed data amount. The data amount of reception packet 1206 corresponds to a total data amount of (one or a plurality of) stored reception packet(s) 1206. The content of reception packet 1206 corresponds to a content of stored reception packet 1206.

More specifically, mode management module 1208 gives a return command to main control unit 110 when the data amount of reception packet 1206 stored in memory 1204 satisfies the first condition. Main control unit 110 makes mode transition from the power saving mode to the normal mode in response to the return command from radio communication unit 120.

Main control unit 110 may return in accordance with the number of received packets (whether or not a prescribed number of packets have been received).

Any interrupt signal can be used as such a return command. For example, an interrupt signal by means of a general-purpose input/output (GPIO), an interrupt signal (INTx) prepared in peripheral component interconnect (PCI) Express, or an interrupt signal prepared in a universal serial bus (USB) can be used for such an interrupt signal. Main control unit 110 can sense such an interrupt signal also in the power saving mode. Main control unit 110 is configured to sense a signal from radio communication unit 120 indicating mode transition (a return command or an interrupt signal) also in the power saving mode.

Main control unit 110 performs processing including reading by data reading module 1102 of reception packet 1206 stored in memory 1204 when it makes transition from the power saving mode to the normal mode, and after it performs the processing, it makes mode transition from the normal mode to the power saving mode. More specifically, data reading module 1102 of main control unit 110 accesses memory 1204 and reads reception packet 1206 stored in memory 1204, and data processing module 1104 processes reception packet 1206 read by data reading module 1102.

Main control unit 110 may erase read reception packet 1206 stored in memory 1204. Specifically, data reading module 1102 of main control unit 110 may erase, after it reads a packet stored in memory 1204, that read packet from memory 1204.

Data reading module 1102 thus reads reception packet 1206 stored in memory 1204 when main control unit 110 makes mode transition from the power saving mode to the normal mode. Reception packet 1206 which has been processed by data processing module 1104 is basically erased from memory 1204. Thereafter, main control unit 110 automatically makes transition from the normal mode to the power saving mode. Processing by main control unit 110 to return to the power saving mode does not require an operation by a user but is autonomously performed on condition that necessary processing is completed.

Processing of read reception packet 1206 performed by data processing module 1104 is not particularly limited, and any processing can be adopted. Data processing module 1104 may perform not only processing of read reception packet 1206 but also perform another type of processing additionally. When processing by data processing module 1104 is completed, information processing apparatus 100 returns to the power saving mode and waits for a return command from radio communication unit 120.

Though FIG. 5 shows an example in which memory 1204 is implemented as a part of radio communication unit 120, it may be implemented as a part of main control unit 110 or implemented independently of radio communication unit 120 and main control unit 110.

Though FIG. 5 shows an example in which data reading module 1102 is implemented as a part of main control unit 110, it may be implemented as a part of radio communication unit 120 or implemented independently of radio communication unit 120 and main control unit 110.

Figure 6:
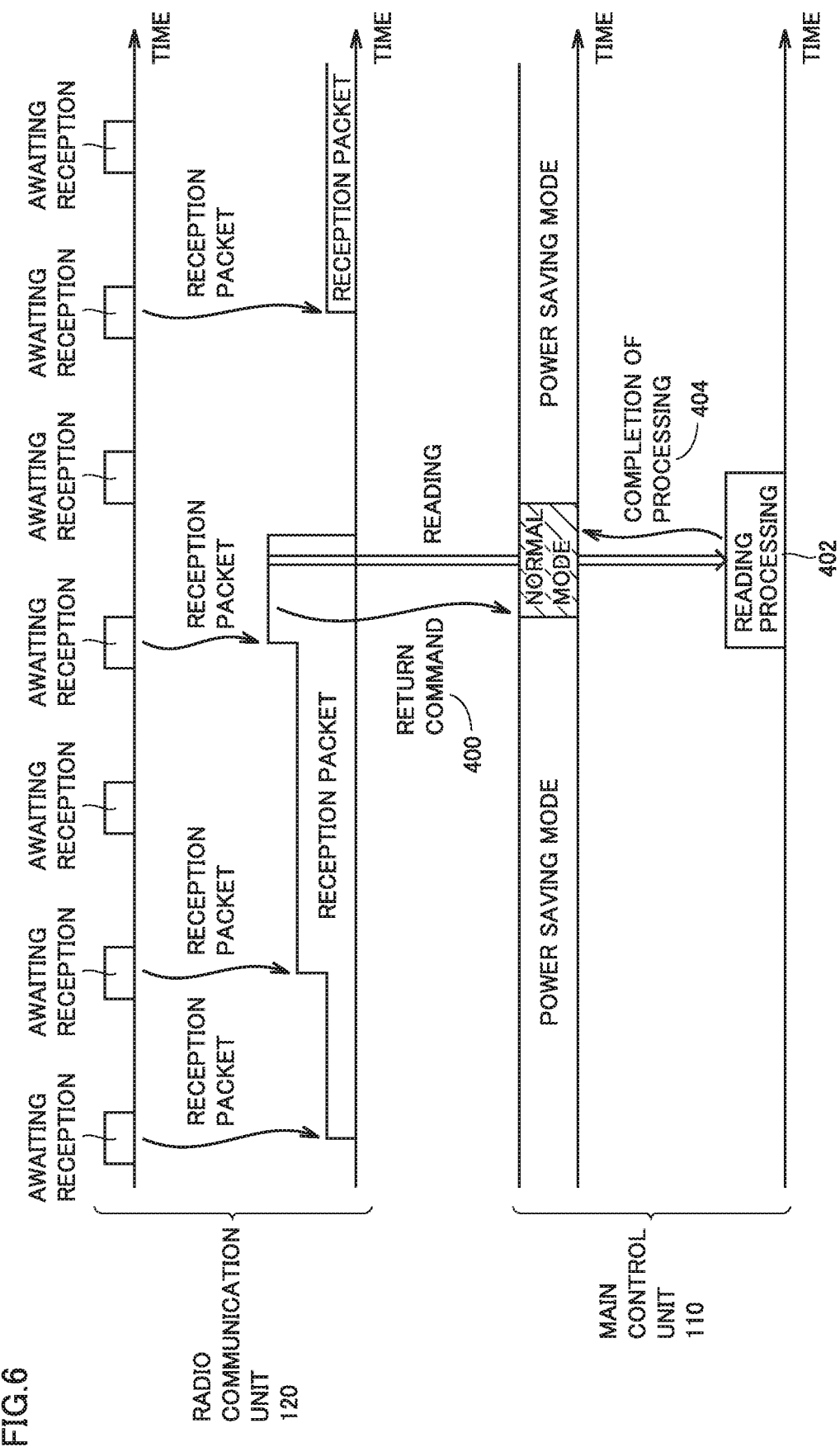
FIG. 6 shows an exemplary illustrative non-limiting time chart illustrating management of the operation mode in the information processing apparatus according to the present embodiment.

Referring to FIG. 6, radio communication unit 120 periodically enters the reception awaiting state. When packet 300 arrives from another information processing apparatus 100 in this reception awaiting state, arriving packet 300 is received and stored in memory 1204 as reception packet 1206.

Memory 1204 successively stores reception packet 1206 received by receiver 1202.

When a data amount of reception packet 1206 stored in receiver 1202 satisfies the first condition, radio communication unit 120 (mode management module 1208) gives a return command 400 to main control unit 110. When a plurality of areas for storing reception packets 1206 are prepared in advance as will be described later, whether or not to give return command 400 may be determined based on the number of areas where reception packets 1206 have already been stored among the plurality of areas (that is, how many storage areas have already been used among the storage areas prepared in advance).

Thus, "based on the data amount of the packet stored in memory 1204" in the present disclosure refers to a concept including not only an example of determination based on a total amount (a numeric value) of data of reception packets 1206 stored in memory 1204 but also an example of determination based on the number of stored reception packets 1206.

Main control unit 110 makes mode transition from the power saving mode to the normal mode in response to return command 400. Then, main control unit 110 (data reading module 1102 and data processing module 1104) performs processing including reading processing 402 by data reading module 1102 of reception packets 1206 stored in memory 1204. When processing including reading processing 402 is completed (completion of processing 404), main control unit 110 returns from the normal mode to the original power saving mode.

In information processing apparatus 100 according to the present embodiment, radio communication unit 120 successively transmits and receives packet 300 and main control unit 110 is caused by radio communication unit 120 to intermittently perform processing of reception packet 1206. By adopting such an operation in main control unit 110 and radio communication unit 120, power consumption in information processing apparatus 100 as a whole can be reduced by allowing main control unit 110 to operate only for a required period while transmission and reception of packet 300 is continued.

[E. Data Format of Packet]

Figure 7:
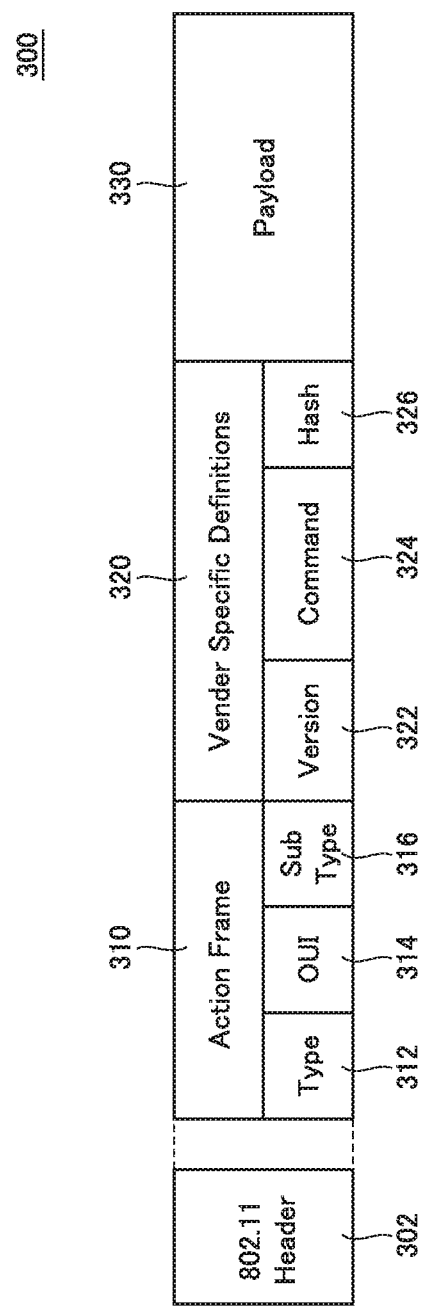
FIG. 7 shows an exemplary illustrative non-limiting drawing illustrating a data format of a packet transmitted by the information processing apparatus according to the present embodiment.

One example of a data format of packet 300 transmitted by information processing apparatus 100 will now be described with reference to FIG. 7.

The data format of packet 300 mainly includes a 802.11 header 302, an action frame definition section 310, a vendor-defined section 320, and a payload section 330.

Information processing apparatus 100 according to the present embodiment transmits and receives a packet under IEEE 802.11 standards. Therefore, 802.11 header 302 of packet 300 stores header information defined under the IEEE 802.11 standards.

Action frame definition section 310 stores information indicating that packet 300 is an action frame defined under the IEEE 802.11 standards. Packet 300 is a unique frame defined by the vendor and action frame definition section 310 stores information indicating that a packet is a unique frame defined by the vendor (which is also referred to as an organizationally unique identifier (OUI)). More specifically, action frame definition section 310 includes an OUI type area 312, an OUI area 314, and an OUI sub type area 316.

Vendor-defined section 320 stores information necessary for data exchange according to the present embodiment. More specifically, vendor-defined section 320 includes a version area 322, a command area 324, and a hash value area 326. Version area 322 stores identification information for ensuring compatibility of a data exchange protocol according to the present embodiment. Command area 324 stores information representing a type of packet 300 to be transmitted. Hash value area 326 stores a hash value as identification information for identifying packet 300. A hash value stored in hash value area 326 is calculated from a payload (substantial data) stored in payload section 330. A hash value stored in hash value area 326 is calculated in advance by information processing apparatus 100 which is a sender of packet 300.

Since packet 300 should only be identified, unique information not dependent on a payload (substantial data) may be employed as identification information (hash value) unlike the disclosure described above.

Payload section 330 stores a substance of data to be carried by packet 300.

[F. Processing for Filtering Reception Packet]

In information processing system 1 according to the present embodiment, each information processing apparatus 100 periodically transmits a packet. When a transmitted packet arrives during a reception awaiting period of any information processing apparatus 100, that packet is received. Since such a communication procedure is adopted, identical packets from identical information processing apparatus 100 may be received a plurality of times.

In the present embodiment, only a packet which satisfies a second condition among packets received by information processing apparatus 100 is preferably stored in memory 1204. Processing for selectively storing only a packet which satisfies the second condition is also referred to as "filtering processing" below. The second condition is also referred to as a "filtering condition." Filtering processing performed on a reception packet will be described below.

Figure 8:
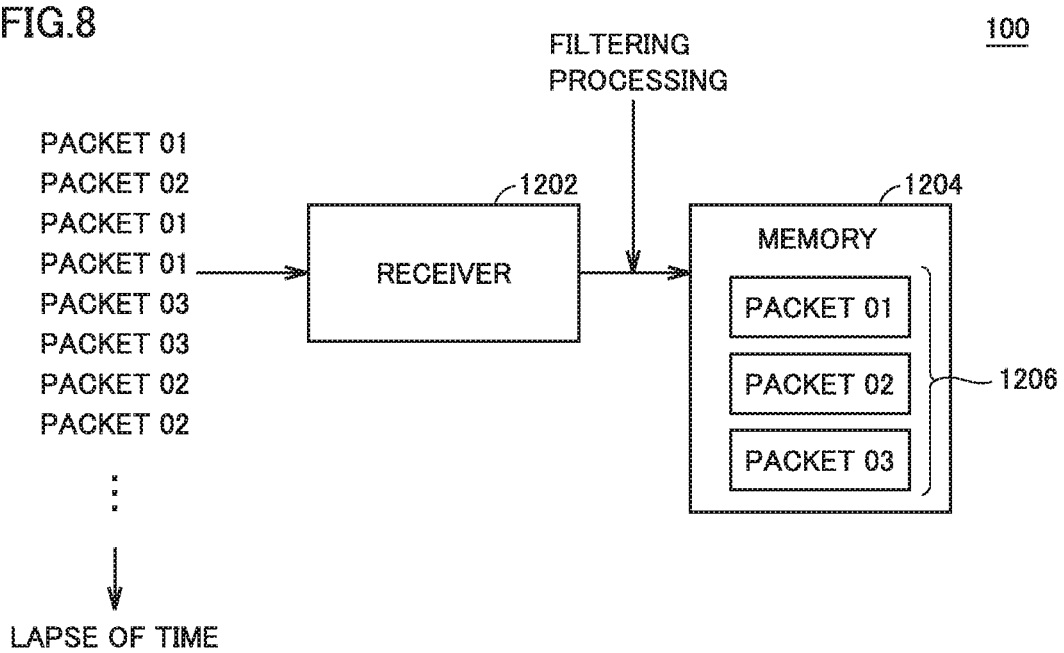
FIG. 8 shows an exemplary illustrative non-limiting drawing illustrating processing for filtering a reception packet in the information processing apparatus according to the present embodiment.

Referring to FIG. 8, for example, it is assumed that receiver 1202 of information processing apparatus 100 chronologically receives a plurality of packets (a packet 01, a packet 02, a packet 03, . . . ).

A filtering condition that only a packet which is not identical to a received in advance packet among a plurality of received packets is stored in memory 1204 is assumed in a typical example of filtering processing in information processing apparatus 100 according to the present embodiment. Namely, such a condition that a packet identical to a packet received in advance among a plurality of received packets is excluded from packets to be stored in memory 1204 is assumed.

With adoption of such a filtering condition, even though a plurality of packets including identical packets are received as shown in FIG. 8, only unique packets (three types of packets 01, 02, and 03 in the example shown in FIG. 8) are stored in memory 1204. By applying the filtering processing, more types of reception packets can be stored even though a storage area is limited.

Memory 1204 of information processing apparatus 100 thus stores a packet which satisfies the filtering condition among packets received by receiver 1202.

Figure 9:
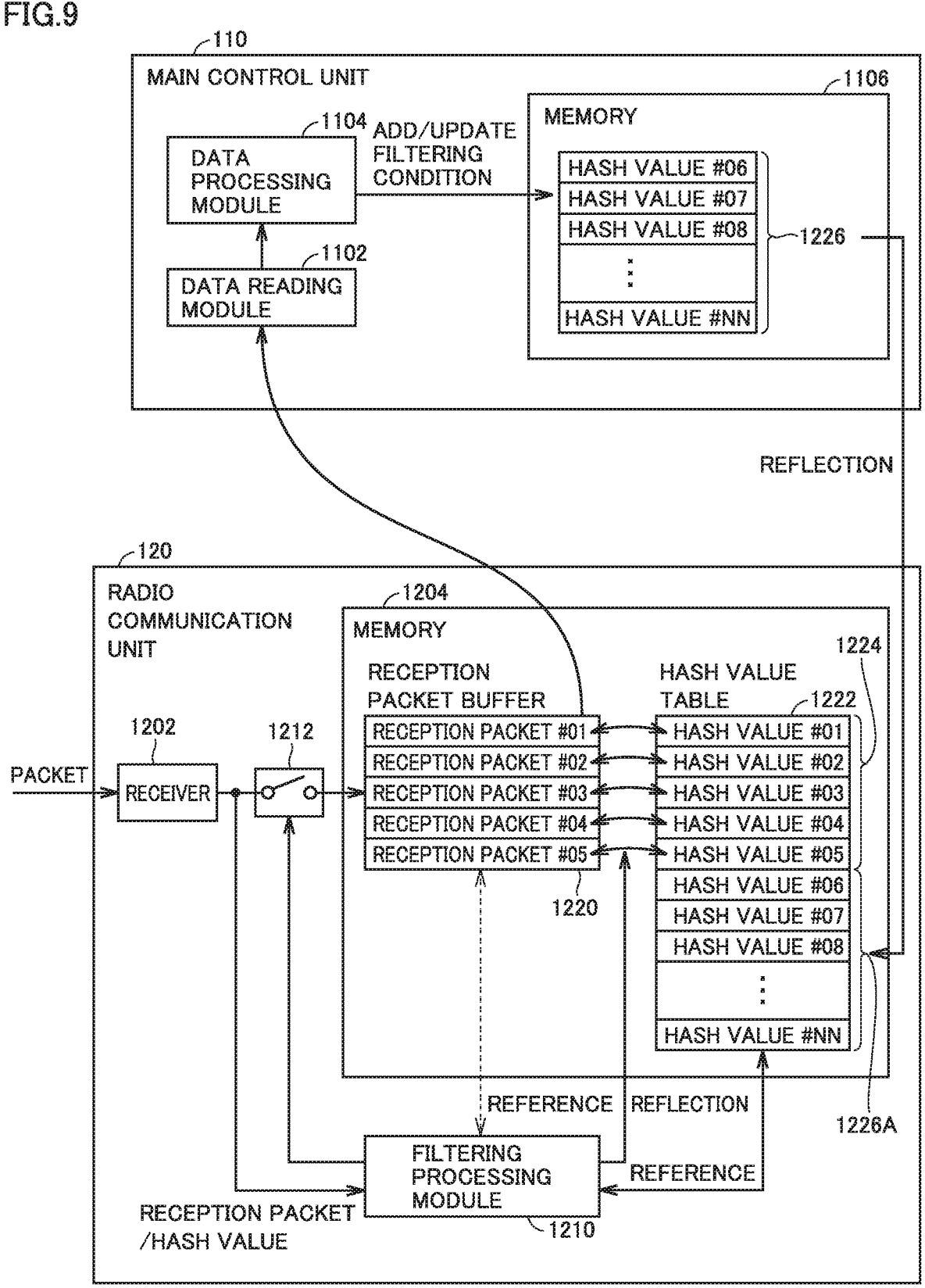
FIG. 9 shows an exemplary illustrative non-limiting drawing illustrating a configuration for performing processing for filtering a reception packet in the information processing apparatus according to the present embodiment.

Referring to FIG. 9, radio communication unit 120 further includes a filtering processing module 1210 and a logical switch 1212. Filtering processing module 1210 and logical switch 1212 are implemented by execution of firmware 127 by processor 126 of radio controller 124.

Main control unit 110 includes a memory 1106 in addition to data reading module 1102 and data processing module 1104. Memory 1106 is implemented by main memory 114 and/or non-volatile memory 116 (FIG. 2). Memory 1106 is provided with a hash value table including a second hash value group 1226.

Filtering processing module 1210 determines whether or not a packet received by receiver 1202 satisfies a filtering condition, and when it determines that the filtering condition is satisfied, it activates logical switch 1212 to logically couple receiver 1202 and memory 1204 to each other. A packet received by receiver 1202 is thus stored in memory 1204.

Memory 1204 is provided with a reception packet buffer 1220 and a hash value table 1222. Reception packet buffer 1220 temporarily stores a received packet. Hash value table 1222 includes a hash value used as one example of a filtering condition and calculated from substantial data included in a packet. The hash value represents one example of identification information for identification of a received packet and corresponds to a value representing data which constitutes the packet.

In the present embodiment, a hash value calculated from data which constitutes a packet received by receiver 1202 is used as a value representing the data which constitutes the packet. Without being limited to the hash value, any kind of information which allows distinction of a received packet from another packet may be employed as identification information. For example, a part or the entirety of substantial data itself included in a received packet may be employed as identification information.

Thus, a value representing data which constitutes a packet received by receiver 1202 (a hash value in this example) or at least a part of data as it is which constitutes the packet received by receiver 1202 may be used as identification information.

As described with reference to FIG. 7 above, a hash value uniquely calculated from a payload (substantial data) stored in each packet 300 is added to packet 300 transmitted from each information processing apparatus 100. A hash value used as the filtering condition, by being added by a sender of a packet of interest, thus simplifies and accelerates processing in radio communication unit 120. Addition of a hash value by a sender of packet 300 is not a requirement, and a corresponding hash value may be calculated each time radio communication unit 120 receives a packet.

Filtering processing module 1210 determines matching between a hash value calculated from a packet received by receiver 1202 and a hash value stored in hash value table 1222, by referring to hash value table 1222. When the hash value calculated from the received packet matches with any hash value stored in hash value table 1222, the received packet is excluded from packets to be stored in memory 1204 (for example, the received packet is discarded).

The filtering condition (that is, the second condition for a packet among reception packets to be stored in memory 1204) is determined based on identification information (a hash value in this example) of a packet received in advance by receiver 1202. Such a filtering condition is stored in hash value table 1222.

In the example shown in FIG. 9, hash value table 1222 includes two types of hash values as a typical example. Specifically, hash value table 1222 includes a first hash value group 1224 and a second hash value group 1226A.

First hash value group 1224 includes a hash value corresponding to each reception packet stored in reception packet buffer 1220. A hash value in first hash value group 1224 is dynamically updated in accordance with a status of a reception packet stored in reception packet buffer 1220. More specifically, filtering processing module 1210 causes a hash value calculated from a reception packet stored in reception packet buffer 1220 to be reflected on first hash value group 1224 in hash value table 1222.

By adopting processing for reflecting reception packet buffer 1220 on first hash value group 1224, when a reception packet stored in reception packet buffer 1220 is read by data reading module 1102 of main control unit 110 and the reception packet buffer is emptied, first hash value group 1224 is also emptied. The hash value included in first hash value group 1224 thus reflects a status of a reception packet stored in reception packet buffer 1220.

The filtering condition (that is, the second condition for a packet among reception packets to be stored in memory 1204) is thus at least partly determined based on a reception packet which is stored in memory 1204 but has not yet been read into main control unit 110. A hash value of a reception packet held in reception packet buffer 1220 of memory 1204 corresponds to at least a part of a filtering condition and these hash values are stored in hash value table 1222 as first hash value group 1224.

A content in second hash value group 1226 is set and updated by main control unit 110. Second hash value group 1226 may mainly be accessed when main control unit 110 is in the normal mode.

In the example shown in FIG. 9, data processing module 1104 of main control unit 110 is responsible for addition and update of a hash value to be included in second hash value group 1226 in memory 1106. Typically, data processing module 1104 adds a hash value calculated from a processed reception packet to second hash value group 1226 or updates any hash value included in second hash value group 1226 with a hash value calculated from the processed reception packet.

Second hash value group 1226 stored in memory 1106 of main control unit 110 is synchronized with second hash value group 1226A included in hash value table 1222 stored in memory 1204 of radio communication unit 120. More specifically, filtering processing module 1210 may access memory 1106 of main control unit 110 to copy second hash value group 1226 to memory 1204. Alternatively, data processing module 1104 of main control unit 110 may copy second hash value group 1226 stored in memory 1106 of main control unit 110 to memory 1204.

Radio communication unit 120 can thus process a packet received by receiver 1202 in accordance with a filtering condition determined by main control unit 110, by reflecting a content in second hash value group 1226 stored in memory 1106 of main control unit 110 on hash value table 1222 stored in memory 1204 of radio communication unit 120.

By adopting processing for adding a hash value as described above, a reception packet stored in reception packet buffer 1220 is processed by data processing module 1104 and erased from reception packet buffer 1220. Then, a hash value which is identification information of the erased reception packet in reception packet buffer 1220 is transferred from first hash value group 1224 to second hash value group 1226. Even though a reception packet stored in reception packet buffer 1220 is erased, a corresponding hash value continues to exist in hash value table 1222. Therefore, even though a packet identical to an already received packet is received, redundant processing can be avoided.

Though second hash value group 1226 typically includes a hash value of a reception packet which has been processed by data processing module 1104, limitation thereto is not necessarily required. For example, when advance information about a fraudulent or malicious packet received by another information processing apparatus 100 can be obtained, a hash value of a packet which should not be received may be included in second hash value group 1226 based on the advance information (use like a blacklist).

The description above provides an example in which a received packet is stored in memory 1204 only when a hash value is different from the hash value included in hash value table 1222. In contrast, a received packet may be stored in memory 1204 only when a hash value matches with a hash value included in hash value table 1222 (use like a white list).

Thus, a filtering condition (that is, the second condition for a packet among reception packets to be stored in memory 1204) is at least partly determined by main control unit 110. A filtering condition (a hash value in this example) determined by main control unit 110 is stored in hash value table 1222 as second hash value group 1226.

FIG. 9 shows a configuration example in which first hash value group 1224 and second hash value group 1226 are included in hash value table 1222. Without being limited as such, any one hash value group may be included in hash value table 1222. The filtering condition may consist of a single condition.

There are two methods of (1) a method of dynamically generating a hash value based on at least a part of a received packet after reception of the packet and (2) a method of adding a hash value in a sender of the packet (that is, initially adding a hash value to the packet) as methods of obtaining a hash value as described above. Only one or both of (1) and (2) may be adopted.

The configuration example shown in FIG. 9 shows a configuration in which second hash value group 1226 is stored in memory 1106 of main control unit 110 and first hash value group 1224 and second hash value group 1226A (synchronized with second hash value group 1226) are stored in memory 1204 of radio communication unit 120. A memory which stores a hash value, however, may be arranged at any position. For example, a memory may be arranged at any portion other than main control unit 110 and radio communication unit 120.

Alternatively, second hash value group 1226 stored in memory 1106 of main control unit 110 does not have to be provided but second hash value group 1226 may directly be written into memory 1204 of radio communication unit 120 from main control unit 110. Further alternatively, first hash value group 1224 stored in memory 1204 of radio communication unit 120 does not have to be provided but first hash value group 1224 and second hash value group 1226 may be stored in memory 1106 of main control unit 110.

In general, memory 1204 of radio communication unit 120 is lower in total capacity than memory 1106 of main control unit 110. Therefore, in some cases, a hash value used as a past filtering condition cannot permanently be stored. Therefore, a hash value stored in memory 1204 of radio communication unit 120 may be transferred at appropriate timing to memory 1106 of main control unit 110. Furthermore, by returning to memory 1204 of radio communication unit 120, a hash value transferred from memory 1204 of radio communication unit 120 to main control unit 110, the hash value can also be used again in radio communication unit 120.

[G. Processing Procedure]

A processing procedure involved with transmission and reception of packet 300 in information processing apparatus 100 according to the present embodiment will now be described with reference to FIG. 10.

Figure 10:
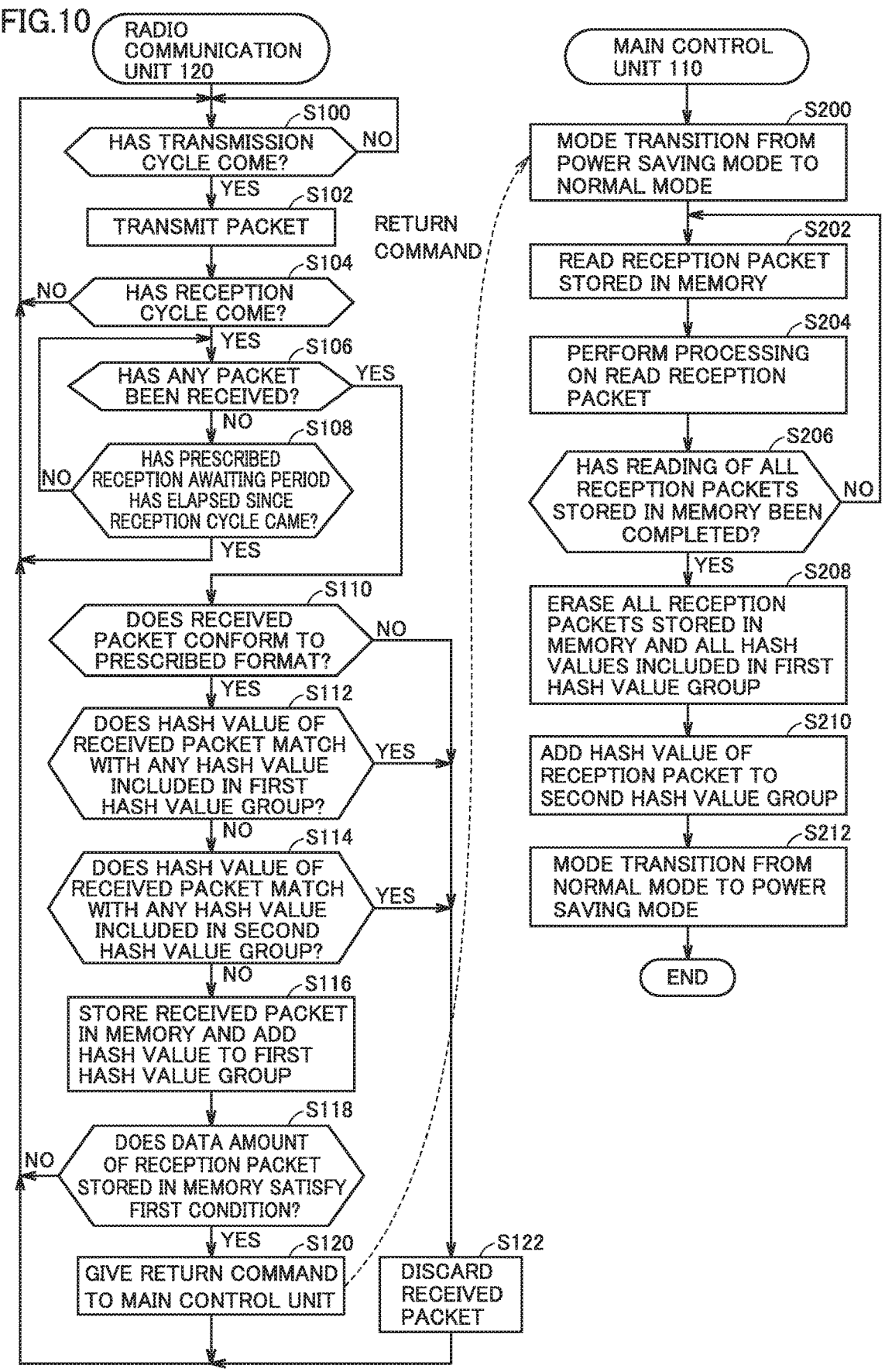
FIG. 10 shows an exemplary illustrative non-limiting flowchart illustrating a processing procedure involved with transmission and reception of a packet in the information processing apparatus according to the present embodiment.

FIG. 10 shows processing in main control unit 110 and radio communication unit 120 implementing information processing apparatus 100 as being distinguished.

Processor 126 of radio controller 124 included in radio communication unit 120 determines whether or not a cycle of transmission of packet 300 has come (step S100). When the cycle of transmission of packet 300 has not yet come (NO in step S100), processing in step S100 is repeated.

When the cycle of transmission of packet 300 has come (YES in step S100), radio communication unit 120 transmits packet 300 (step S102).

In succession, processor 126 of radio communication unit 120 determines whether or not a reception cycle has come (step S104). When the reception cycle has not yet come (NO in step S104), processing hereafter is skipped and processing in step S100 and subsequent steps is repeated.

When the reception cycle has come (YES in step S104), processor 126 of radio communication unit 120 determines whether or not it has received any packet (step S106). When it has received no packet (NO in step S106), processor 126 of radio communication unit 120 determines whether or not a prescribed reception awaiting period since arrival of the reception cycle has elapsed (step S108).

When the prescribed reception awaiting period since arrival of the reception cycle has not elapsed (NO in step S108), processing in step S106 and a subsequent step is repeated. In contrast, when the prescribed reception awaiting period since arrival of the reception cycle has elapsed (YES in step S108), processing in step S100 and subsequent steps is repeated.

When some packet has been received (YES in step S106), processor 126 of radio communication unit 120 determines whether or not the received packet conforms to a prescribed format in which a packet with the format should be received (step S110). When the reception packet does not conform to the prescribed format (NO in step S110), radio communication unit 120 discards the received packet (step S122). Then, processing in step S100 and subsequent steps is repeated.

When the received packet conforms to the prescribed format (YES in step S110), processor 126 of radio communication unit 120 determines whether or not a hash value of the received packet matches with any hash value included in first hash value group 1224 (step S112). When the hash value of the received packet matches with any hash value included in first hash value group 1224 (YES in step S112), radio communication unit 120 discards the received packet (step S122). Then, processing in step S100 and subsequent steps is repeated.

When the hash value of the received packet does not match with any hash value included in first hash value group 1224 (NO in step S112), processor 126 of radio communication unit 120 determines whether or not the hash value of the received packet matches with any hash value included in second hash value group 1226 (step S114). When the hash value of the received packet matches with any hash value included in second hash value group 1226 (YES in step S114), radio communication unit 120 discards the received packet (step S122). Then, processing in step S100 and subsequent steps is repeated.

When the hash value of the received packet does not match with any hash value included in second hash value group 1226 (NO in step S114), processor 126 of radio communication unit 120 has memory 1204 store the received packet as the reception packet and adds the hash value of the received packet to first hash value group 1224 (step S116). Then, processor 126 of radio communication unit 120 determines whether or not a data amount of the reception packet stored in memory 1204 satisfies the first condition (in this example, whether or not a data amount of the reception packet exceeds a prescribed data amount) (step S118).

When the data amount of the reception packet stored in memory 1204 does not satisfy the first condition (NO in step S118), processing in the current reception cycle ends and processing in step S100 and subsequent steps is repeated.

In the processing procedure described above, processing for determining whether or not a data amount of a packet stored in memory 1204 satisfies the first condition (step S118) is exemplified. Without being limited as such, processing for determining whether or not the number of packets stored in memory 1204 satisfies the first condition (more specifically, whether or not the number of packets stored in memory 1204 exceeds a prescribed number) may be adopted as step S118.

Alternatively, as will be described later, processing for determining whether or not a content of a packet stored in memory 1204 satisfies the first condition (more specifically, whether or not a content of a packet stored in memory 1204 includes prescribed data) may be adopted as step S118.

Thus, in step S118 described above, any one of determination as to whether or not a data amount of a reception packet exceeds a prescribed data amount, determination as to whether or not the number of reception packets exceeds a prescribed number, and determination as to whether or not a content of a reception packet includes prescribed data may be made, or a plurality of determinations among these may simultaneously be made.

In contrast, when a data amount of a reception packet stored in memory 1204 satisfies the first condition (YES in step S118), processor 126 of radio communication unit 120 gives return command 400 to main control unit 110 (step S120). Then, processing in the current reception cycle by radio communication unit 120 ends and processing in step S100 and subsequent steps is repeated.

Main control unit 110 which has received return command 400 from radio communication unit 120 makes mode transition from the power saving mode to the normal mode (step S200). Then, main control unit 110 reads reception packet 1206 stored in memory 1204 of radio communication unit 120 (step S202). Then, main control unit 110 performs processing on read reception packet 1206 (step S204).

Main control unit 110 determines whether or not reading of all reception packets 1206 stored in memory 1204 of radio communication unit 120 has been completed (step S206). When reading of all reception packets 1206 stored in memory 1204 of radio communication unit 120 has not been completed (NO in step S206), processing in step S202 and subsequent steps is repeated.

When reading of all reception packets 1206 stored in memory 1204 of radio communication unit 120 has been completed (YES in step S206), processor 126 of radio communication unit 120 erases all reception packets 1206 stored in memory 1204 of radio communication unit 120 and all hash values included in first hash value group 1224 (step S208).

In succession, main control unit 110 adds a hash value of processed reception packet 1206 to second hash value group 1226 in memory 1106 based on a result of processing performed (S210). When the number of hash values in second hash value group 1226 stored in memory 1106 has reached the upper limit, some or all of hash values already stored in second hash value group 1226 may be erased under a predetermined rule and then a new hash value may be added. A content in updated second hash value group 1226 stored in memory 1106 is reflected on hash value table 1222 stored in memory 1204 of radio communication unit 120.

Then, main control unit 110 makes mode transition from the normal mode to the power saving mode (step S212). A series of processing in radio communication unit 120 thus ends.

For the sake of convenience of description, FIG. 10 shows a processing example in which main control unit 110 has reception packet 1206 and first hash value group 1224 in memory 1204 of radio communication unit 120 erased. Such data may be erased, however, by coordination between main control unit 110 and radio communication unit 120. For example, when a command for erasure is given from main control unit 110 to radio communication unit 120, radio communication unit 120 may perform processing for erasing data in memory 1204.

In FIG. 10 described above, in step S202, main control unit 110 may read at once, all reception packets 1206 stored in memory 1204.

[H. Modification of Format Check and Filtering Processing]

In the description above, processing for avoiding redundant storage of identical packets by using identification information (for example, a hash value) for identifying a received packet is exemplified as processing for filtering a reception packet. Filtering processing according to the present embodiment includes processing for determining whether or not a received packet conforms to a prescribed format (see step S110 in FIG. 10).

By way of example of format check of a received packet, a content in action frame definition section 310 and vendor-defined section 320 (see FIG. 7) included in the packet is used. More specifically, a condition that vendor-defined information expected to be received in advance is stored in action frame definition section 310 and/or a condition that a version or a command stored in vendor-defined section 320 is information expected to be received in advance may be adopted as the condition.

Any one piece of or any plurality of pieces of information can be used as the second condition (filtering condition) for determination as to whether or not a received packet is to be stored in memory 1204.

For example, 802.11 header 302 (see FIG. 7) of a received packet includes a media access control (MAC) address or an internet protocol (IP) address of a sender of the packet. Information for specifying the sender of the packet such as the MAC address or the IP address may be adopted as the filtering condition. In this case, such filtering processing as receiving only a packet from a sender having a specific address (white list) or not receiving a packet from a sender having a specific address (blacklist) can be applied.

A packet from an apparatus from which a packet was once received may be filtered out and not received (even though that packet is different in type) by referring to identification information specific to the apparatus such as a MAC address or identification information specific to a particular manufacturer such as an OUI.

Since a hash value calculated by a sender is added to packet 300 according to the present embodiment, identity between a hash value calculated by a reception side of packet 300 and the hash value added to packet 300 may be assessed. By assessing identity between the hash values, corruption or tampering of packet 300 in a process of transmission can be sensed.

Filtering processing may be performed based on combination of a plurality of factors. For example, a MAC address and a hash value may be combined with each other.

A sender of packet 300 may add identification information to payload section 330 of packet 300 and a reception side may determine whether or not to store received packet 300 in memory 1204 based on the identification information stored in payload section 330. The second condition (filtering condition) for determining whether or not to store received packet 300 in memory 1204 may at least partly be determined based on identification information of a packet received in advance by receiver 1202.

[I. Additional Configuration]

Some of additional configurations of information processing apparatus 1 according to the present embodiment will now be described.

(i1: Information on Time)

In information processing apparatus 100 according to the present embodiment, a packet received by radio communication unit 120 while main control unit 110 is in the power saving mode is processed at a later time by main control unit 110. Therefore, timing of processing of the packet by main control unit 110 is later than timing of reception of the packet to be processed. Alternatively, main control unit 110 may not be able to obtain timing of reception of each packet.

In the present embodiment, when radio communication unit 120 receives a packet and the received packet is stored in memory 1204, information representing timing of reception of each packet may be added.

Figure 11:
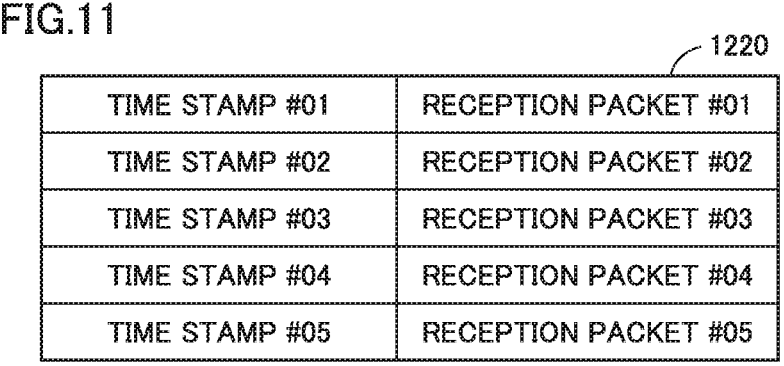
FIG. 11 shows an exemplary illustrative non-limiting drawing illustrating a data structure of a reception packet stored in a memory of the information processing apparatus according to the present embodiment.

Referring to FIG. 11, reception packet buffer 1220 in memory 1204 of information processing apparatus 100 may store, in association with a reception packet, a time stamp as being added as one example of time information which represents time of reception of each reception packet.

More specifically, when radio communication unit 120 receives a reception packet, it obtains a time stamp from a real time clock mounted on radio communication unit 120 at the timing of reception of the reception packet and adds the time stamp to the reception packet.

Receiver 1202 of radio communication unit 120 may thus provide a time stamp to a received packet. By adding a time stamp to each packet, even though main control unit 110 processes a packet at a later time, processing by making use of information such as reception timing can be performed.

More specifically, when main control unit 110 reads one reception packet or a plurality of reception packets, values of added time stamps may be compared among the read reception packets and a newer reception packet or an older reception packet may selectively be made use of.

(i2: Forced Startup Mode)

The description above provides an example in which when a data amount of reception packet 1206 stored in memory 1204 of radio communication unit 120 satisfies the first condition, main control unit 110 makes mode transition from the power saving mode to the normal mode. Processing for main control unit 110 to make mode transition from the power saving mode to the normal mode regardless of a data amount of reception packet 1206 stored in memory 1204, however, may be performed.

More specifically, for example, such processing can be performed by including prescribed information (for example, information on a command) for having main control unit 110 make mode transition from the power saving mode to the normal mode in command area 324 (see FIG. 7) in vendor-defined section 320 included in a packet. Receiver 1202 of radio communication unit 120 may determine whether or not a command for having main control unit 110 make mode transition from the power saving mode to the normal mode is included in command area 324 in vendor-defined section 320 when it checks a format of a received packet.

By adopting such a configuration, mode management module 1208 of radio communication unit 120 can have main control unit 110 make mode transition from the power saving mode to the normal mode regardless of the number of packets stored in memory 1204 and a data amount of a packet (depending on a content of a packet) stored in memory 1204, in response to a packet received by receiver 1202 including instructions to make mode transition to the normal mode. When the content of reception packet 1206 stored in memory 1204 of radio communication unit 120 satisfies the first condition (for example, reception packet 1206 includes a prescribed command), main control unit 110 can make mode transition from the power saving mode to the normal mode.

In response to reception of a packet including such a command, main control unit 110 can return to the normal mode and perform necessary processing. For example, such an application that necessary notification processing is immediately performed when a packet for giving some kind of notification to a user is received is assumed.

[J. Advantages]

According to the present embodiment, even though main control unit 110 is in the power saving mode low in power consumption, receiver 1202 of radio communication unit 120 is able to receive a packet. When at least any one of the number of reception packets 1206 received by receiver 1202 and stored in memory 1204, a data amount of a packet stored in memory 1204, and a content of a packet stored in memory 1204 satisfies the first condition, main control unit 110 makes mode transition from the power saving mode to the normal mode and performs necessary processing, and makes again mode transition to the power saving mode. By making use of such mode transition of main control unit 110, power consumption in information processing apparatus 100 can be reduced.

According to the present embodiment, it is also expected that identical packets are often received in a redundant manner. Even when such identical packets are received in a redundant manner, redundant storage of identical packets can be prevented to make information processing efficient.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. An information processing apparatus comprising:
a receiver configured to receive a plurality of packets from another apparatus through radio communication, the receiver operatively connected to a memory;
the memory being configured to store the plurality of packets received by the receiver, wherein storing the plurality of packets in the memory is conditioned on identification information for determining non-identical ones of the plurality of packets;
an information processor operatively connected to the memory and configured to: (a) perform information processing of the plurality of packets, and (b) transition at least between a first mode and a second mode lower in power consumption than the first mode; and
a mode management circuit connected to the information processor, the mode management circuit being configured to signal or control the information processor to transition from the second mode to the first mode when the number of the plurality of packets stored in the memory exceeds a prescribed number N,
the information processor being further configured to perform processing including reading at least one packet stored in the memory after transitioning from the second mode to the first mode,
the information processor transitioning from the first mode to the second mode after the information processor has performed processing including reading the at least one packet stored in the memory.

2. The information processing apparatus according to claim 1, wherein the mode management circuit is further configured to test whether a data amount of the received plurality of packets exceeds a prescribed data amount.

3. The information processing apparatus according to claim 1, wherein the memory is configured to store received packets which satisfy a non-redundant condition among the plurality of packets received by the receiver.

4. The information processing apparatus according to claim 3, wherein the non-redundant condition includes a condition that the plurality of packets received by the receiver conform to a prescribed format.

5. The information processing apparatus according to claim 3, wherein the non-redundant condition is at least partly determined based on identification information of packets received in advance by the receiver.

6. The information processing apparatus according to claim 5, wherein the identification information is at least one of a value representing data constituting the packets received by the receiver and at least a part of data constituting the packets received by the receiver.

7. The information processing apparatus according to claim 6, wherein the value representing the data constituting each packet received by the receiver comprises a hash value calculated from the data constituting the packet.

8. The information processing apparatus according to claim 7, wherein the hash value is added by a sender of each packet.

9. The information processing apparatus according to claim 3, wherein the non-redundant condition is at least partly determined based on a packet which is stored in the memory but has not yet been read into the information processor.

10. The information processing apparatus according to claim 1, wherein while the information processor operates in the second mode, reception by the receiver and storage in the memory are repeatedly performed.

11. The information processing apparatus according to claim 1, wherein the information processor is further configured to erase, after the information processor reads packets stored in the memory, those read packets from the memory.

12. The information processing apparatus according to claim 1, wherein the receiver is configured to receive the packets without establishing connection to the another apparatus.

13. The information processing apparatus according to claim 1, wherein the receiver is configured to provide time stamp information to the received packets.

14. The information processing apparatus according to claim 1, wherein the packets include data on a game application.

15. The information processing apparatus according to claim 1, wherein
the information processing apparatus further comprises a radio processor which includes at least the receiver and is separated from the information processor and can operate independently of the information processor, and
the information processor is higher in power consumption than the radio processor.

16. The information processing apparatus according to claim 15, wherein the information processor is configured to sense a signal from the radio processor indicating mode transition.

17. The information processing apparatus according to claim 1, wherein the mode management circuit is configured to have the information processor make mode transition from the second mode to the first mode without depending on a data amount of the plurality of packets stored in the memory, in response to the plurality of packets received by the receiver including instructions to make mode transition to the second mode.

18. A control method in an information processing apparatus, the information processing apparatus including a receiver configured to receive a plurality of packets from another apparatus through radio communication, a memory configured to store the plurality of packets received by the receiver, and an information processor configured to perform information processing and to make mode transition at least between a first mode and a second mode lower in power consumption than the first mode, the control method comprising:
receiving a plurality of packets;
storing the received plurality of packets in the memory, wherein the storing of the received plurality of packets in the memory is conditioned on identification information for determining non-identical ones of the plurality of packets,
having the information processor make mode transition from the second mode to the first mode when the number of the plurality packets stored in the memory exceeds a predetermined number N;
performing processing including reading of the plurality of packets stored in the memory after transition from the second mode to the first mode is made; and
the information processor making mode transition from the first mode to the second mode after the information processor has performed the processing.

19. An information processing system including a first information processing apparatus and a second information processing apparatus,
the first information processing apparatus including
a receiver configured to receive a plurality of packets from the second information processing apparatus through radio communication,
a memory configured to store the plurality of packets received by the receiver, wherein the storing of the received plurality of packets in the memory is conditioned on identification information for determining non-identical ones of the plurality of packets,
an information processor configured to perform information processing and to make mode transition at least between a first mode and a second mode lower in power consumption than the first mode,
a mode management circuit configured to have the information processor make mode transition from the second mode to the first mode when the number of the plurality of packets stored in the memory exceeds a predetermined number N, and
a reading circuit configured to read the plurality of packets stored in the memory after the information processor makes mode transition from the second mode to the first mode,
the information processor making mode transition from the first mode to the second mode after the information processor has performed processing including reading of the plurality of packets by the reading module.

20. A non-transitory computer-readable storage medium with an executable control program stored thereon, the control program being executed by an information processing apparatus, the information processing apparatus including radio communication circuitry including a receiver configured to receive a plurality of packets from another apparatus through radio communication, a memory configured to store the plurality of packets received by the receiver, and an information processor configured to perform information processing and to make mode transition at least between a first mode and a second mode lower in power consumption than the first mode, the control program, when executed by the information processor, causing the radio communication circuitry to perform operations comprising:
  having the information processor make mode transition from the second mode to the first mode when the number of the plurality of packets stored in the memory exceeds a predetermined number N,
  the information processor performing processing including reading of the plurality of packets stored in the memory after the information processor makes transition from the second mode to the first mode, and making mode transition from the first mode to the second mode after the information processor has performed the processing,
  wherein storing the plurality of packets in the memory is conditioned on identification information for determining non-identical ones of the plurality of packets.

* * * * *